United States Patent [19]

Weber, Jr.

[11] Patent Number: 5,710,376

[45] Date of Patent: Jan. 20, 1998

[54] CHARGED MASS THIN FILM CONDENSER ACCELEROMETER

[75] Inventor: Gerard Vincent Weber, Jr., Saugerties, N.Y.

[73] Assignee: International Business Machines Corporation, Armonk, N.Y.

[21] Appl. No.: 577,453

[22] Filed: Dec. 22, 1995

[51] Int. Cl.$^6$ .................................................. G01P 15/125
[52] U.S. Cl. .................................... 73/514.32; 361/280
[58] Field of Search ........................ 73/514.32, 514.38, 73/652, 654; 361/280

[56] References Cited

U.S. PATENT DOCUMENTS

| | | | |
|---|---|---|---|
| 3,094,864 | 6/1963 | Kahkonen et al. | 73/514.32 |
| 3,742,767 | 7/1973 | Bernard et al. | 73/517 B |
| 4,516,428 | 5/1985 | Kanomi | 73/654 |
| 4,583,404 | 4/1986 | Bernard et al. | 73/517 B |
| 5,092,174 | 3/1992 | Reidemeister et al. | 73/517 R |
| 5,103,667 | 4/1992 | Allen et al. | 73/1 D |
| 5,117,694 | 6/1992 | Okumura | 73/462 |

FOREIGN PATENT DOCUMENTS 2010437  8/1990  Canada.

*Primary Examiner*—John E. Chapman
*Attorney, Agent, or Firm*—Floyd A. Gonzalez

[57] ABSTRACT

An accelerometer having a pair of spaced apart planar electrodes in a housing wherein one of the planar electrodes is made of a thin film and has a mass attached to one side such that acceleration causes the thin film to flex. A solid state amplifier is located in the housing attached to one of the planar electrodes to measure the change in capacitance caused by the flexing of the thin film. The solid state amplifier may be an NPN transistor. The mass may be a 4.5 mm steel airgun shot, and the thin film may be 1 mil polyester aluminized metallic film. The output of the accelerometer is connected to one input of a operational amplifier, and the other input of the operational amplifier is connected to a transducer measuring ambient noise such that the ambient noise is removed from the signal from the accelerometer.

12 Claims, 3 Drawing Sheets

CHARGED MASS THIN FILM CONDENSER ACCELEROMETER

BACKGROUND OF THE INVENTION

The present invention relates to a condenser accelerometer and more particularly relates to a charged mass accelerometer having spaced apart plates forming a condenser and a spherical mass attached to one plate to cause changes in capacitance when subjected to acceleration.

Present accelerometers are generally complicated devices that require close tolerances and expensive and exacting fabrication techniques. Present accelerometers which are able to measure very low frequency motions in the order of 1 to 10 hertz are very expensive.

U.S. Pat. No. 3,742,767 issued Jul. 3, 1973 to Bernard et al. for Ball Electrostatic Accelerometer discloses an accelerometer which has a ball in a spherical casing and a ball controlling device for each of the three orthogonal axes. Acceleration measurement is deduced from a measurement of the forces required to hold the test weight still or bring it back to a position defined with respect to the hollow cage. Electric circuits are included which detect the position of the ball and an electrostatic circuit for controlling the position of the ball.

U.S. Pat. No. 4,583,404 issued Apr. 22, 1986 to Bernard el al. for Electrostatic Accelerometer discloses and accelerometer having a cube-shaped test weight in a hollow cage. Acceleration measurements are made as in the aforementioned U.S. Pat. No. 3,742,767.

U.S. Pat. No. 5,092,174 issued Mar. 3, 1992 to Reidemeister et al. for Capacitance Accelerometer discloses a capacitive acceleration sensor using a common printed wiring board as a fixed plate of the capacitive transducer, and having a second capacitor plate that moves responsive to acceleration to produce a measurable change in capacitance.

U.S. Pat. No. 5,103,667 issued Apr. 14, 1992 to Allen et al for Self-Testable Micro-Accelerometer and Method discloses an accelerometer having a housing, a diaphragm for detecting movement in response to an applied force, a mass on the diaphragm, at least one capacitive plate attached to the housing and disposed such that a potential difference between the capacitive plate and the mass caused a movement of the mass, electrodes for applying a potential difference between the mass and the capacitive plate, and a least one piezoresistive element attached to the housing and the diaphragm for sensing movement of the mass. A differential amplifier is used to extract a calibration signal from the signal output of a previous amplifier which amplifies the accelerometer plus the calibration signal.

Canadian Patent 2,010,437 dated 1990/08/31 by Winthrop H. McClure for Electrostatic Force Nulling Accelerometer discloses an acceleration sensor that includes two capacitor plates having respective parallel mutually facing major surfaces which bound a sensing gap therebetween and a plate-shaped electrically chargeable proof mass resiliently mounted in the gap in parallelism with the major surfaces for displacement in response to the action of acceleration forces thereon.

SUMMARY OF THE INVENTION

It is an object of the present invention to provide an accelerometer having a pair of spaced apart planer electrodes in a housing. One of the planar electrodes is made of a thin film and has a mass attached to one side such that acceleration causes the thin film to flex. A solid state amplifier is located in the housing attached to one of the planar electrodes to measure the change in capacitance caused by the flexing of the thin film. The solid state amplifier may be an NPN transistor. The mass may be a 4.5 mm steel airgun shot, and the thin film may be 1 mil polyester aluminized metallic film.

It is an object of the present invention to provide an inexpensive, simple to manufacture accelerometer which is sensitive to and measures low frequency vibrations.

It is another object of the present invention to provide an accelerometer and measuring circuit which may be used to cancel ambient noise such that desired vibrations of a unit under test may be measured.

It is another object of the present invention to provide an accelerometer and measuring circuit which has multiple channels such that several points of vibration of a unit under test may be measured simultaneously.

It is another object of the present invention to provide an accelerometer and measuring circuit in which the output signal from the accelerometer is connected to one input of an operational amplifier and a transducer measuring ambient mechanical waves is connected to the other input of an operational amplifier such that the output of the transducer is removed from the signal from the accelerometer.

The foregoing and other objects, features and advantages of the invention will be apparent from the following more particular description of the preferred embodiment of the invention as illustrated in the drawings.

BRIEF DESCRIPTION OF THE DRAWINGS

FIG. 5 is a schematic diagram of a null circuit used with the operational amplifiers of the circuit of FIG. 4.

DESCRIPTION OF THE PREFERRED EMBODIMENT

Figure 1:
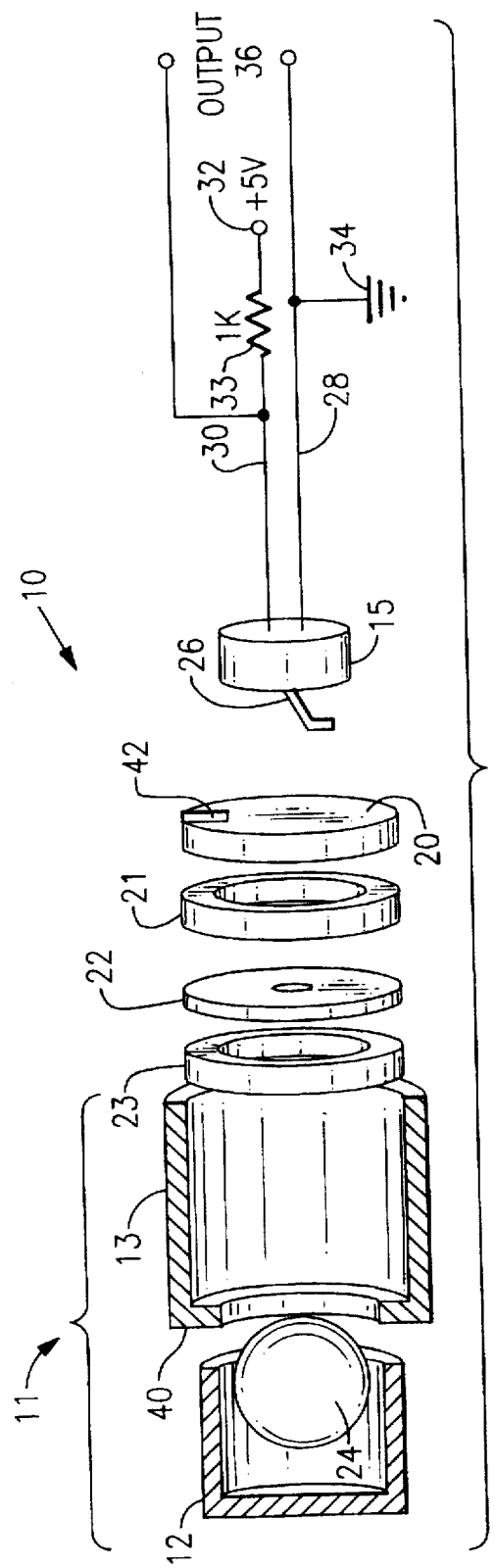
FIG. 1 is an exploded view of the transducer of the present invention.

FIG. 1 is a schematic diagram of the charged mass thin film condenser transducer 10 of the accelerometer of the present invention, wherein the transducer 10 includes a housing assembly 11 having a smaller diameter portion 12 and a larger diameter portion 13, a condenser assembly 14 within the housing assembly 11, and an electrical amplifier 15 for amplifying the changes in the capacitance of the condenser assembly 14. As will be explained, the capacitance of the condenser assembly 14 changes responsive acceleration of the transducer 10 when it is connected to a unit under test.

The condenser assembly 14 includes a plate electrode 20 which is fixed in the housing assembly 11, a dielectric spacer which is, in the present embodiment, a ring 21, a thin film 22 which forms a second plate of the condenser 14, a stiffening ring 23 attached to the thin film 22, and a mass, which in this embodiment, is a sphere or ball 24 connected to a small contact area 25 (see FIG. 2) of the thin film 22. The outer periphery of the plate 20 has at least one slot 42, which will be explained later. In the present embodiment, the electrical amplifier 15 is an NPN transistor having its base connected to the plate electrode 20 by lead 26, its emitter connected to lead 28 extending outside of the housing portion 13 for forming a ground reference lead, and its collector connected to lead 30 extending outside of the housing for forming an output lead. When the transducer is in use, a power supply 32 is connected to a load resistor 33, which is, in turn, connected to the output lead 30, while the ground reference lead 28 is grounded at 34. The output signal of the transducer 10 is measured between ground and the load resistor 33, as shown at 36. The capacitance of the condensor assembly 14 changes as the mass 24 moves and flexes the thin film 22 responsive to acceleration forces that the transducer 10 is being used to measure. It will be understood that the dielectric spacer 21 is of sufficient dimension to space the thin film 22 away from the plate electrode 20 such that there is no contact between the thin film electrode 22 and the plate electrode 20 when the film 22 is flexed to its maximum extent by the mass 24.

In one embodiment of the present invention, the mass 24 has a weight of 5.5 grains (0.35634005 grams), and may be a 4.5 mm steel airgun shot such as available from the Crosman Airgun of East Bloomfield, N.Y. 14443. In the present embodiment, the thin film 22 is a 1 mil thick polyester aluminized metallic film available from Madico Inc. of Woburn, Ma. 01888. The coating density of the aluminum is approximately 0.7 ohms per square.

Figure 2:
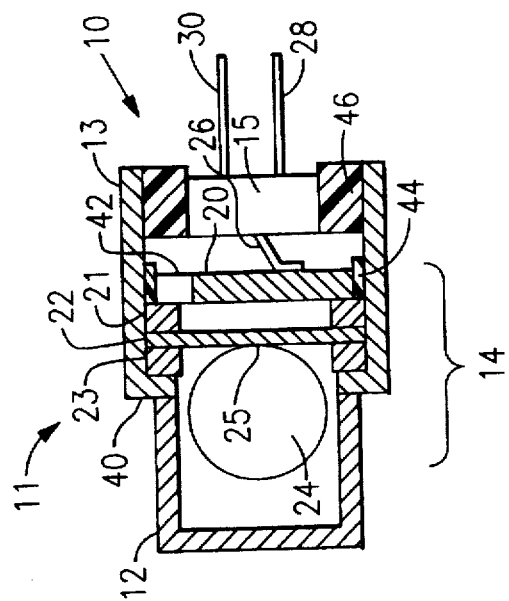
FIG. 2 is a cross-sectional view of the transducer of FIG. 1.

FIG. 2 is a cross-sectional view of the assembled transducer 10. The condenser assembly 14 is assembled and inserted into the large diameter portion 13 of the housing 11 until it comes into contact with and is captured by a reduced portion 40 of the large diameter housing portion 13. The mass 24 extends into the small diameter portion 12 of the housing 11 and is attached to the thin film 22 by epoxy cement. The annular area 44 around the periphery of the plate 20 is filed with epoxy cement to hold the capacitor assembly 14 in the housing 12. The slot 42 provided in the periphery of the plate 20 allows air in the space between the thin film 22 and the plate 20 to move back and forth past the plate 20 as the thin film 22 flexes. It will be understood that the epoxy cement in annular area 44 electrically insulates the plate 20 from the housing 11, and thus from the other electrode of the condenser assembly formed by the stiffening ring 23 and thin film 22. The housing assembly 11 further acts to acoustically isolate the condenser assembly 14 to dampen effects on the condenser assembly 14 by acoustical noise. The stiffening ring 23 and thin film 22 come into contact with the large diameter portion 13 of the housing 11, such that when the condenser assembly 14 is charged from the power supply 32, the plate 20 will have a positive charge, and the thin film 22, spherical mass 24 and housing assembly 11 will be negative with respect to the plate 20. The base lead 26 of the transistor 15 is soldered to the plate 20, and the transistor is secured in place by epoxy cement at 46 to make a sealed assembly. The ground reference lead 28 may be connected to the housing assembly 11 either internally within the housing assembly 11, or externally, as desired, to complete the circuit thereby charging the thin film 22 and mass 24 through the stiffening ring 23 and housing 11 with a charge opposite to the charge on the plate electrode 20, as is well understood in the art.

Figure 3:
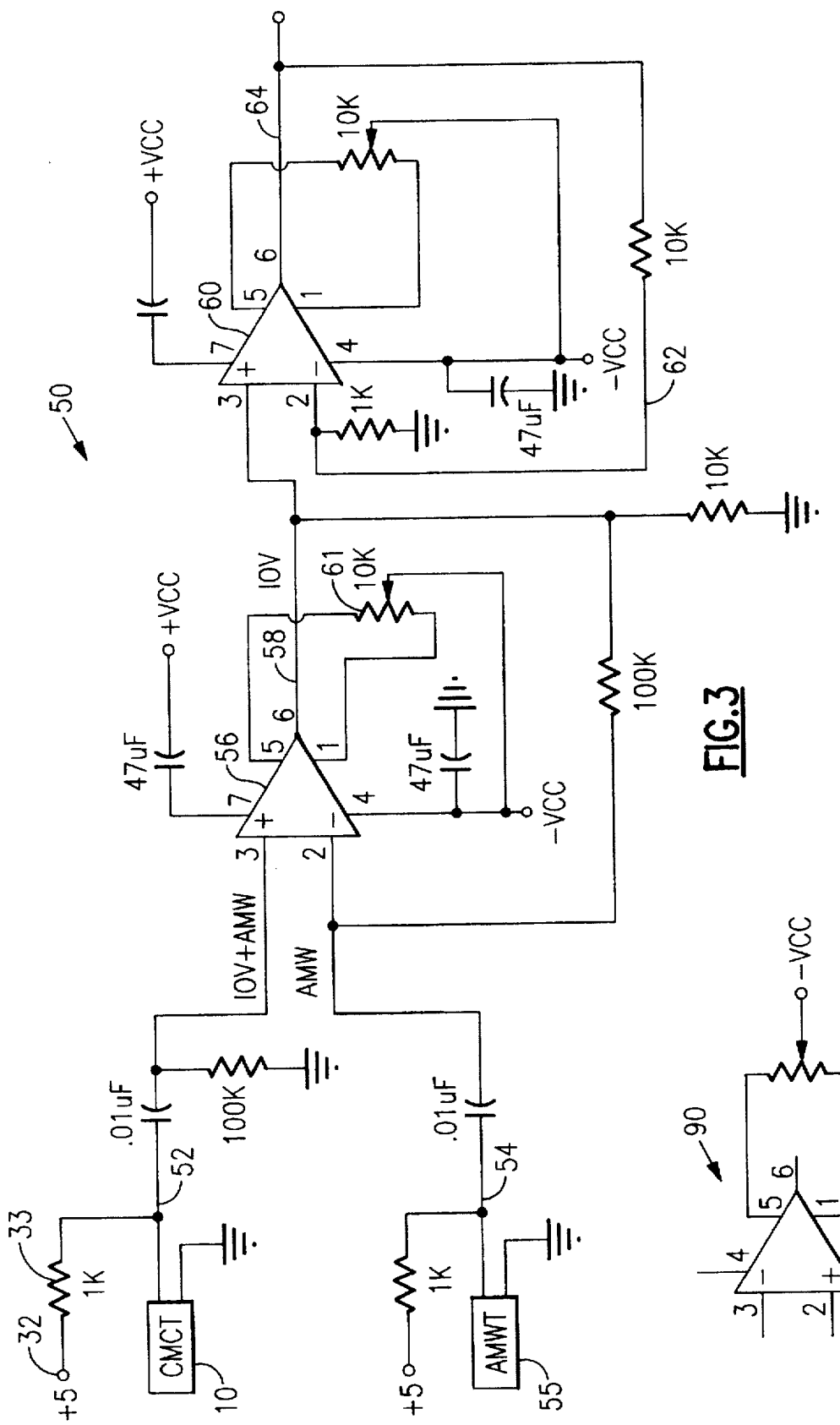
FIG. 3 is a schematic diagram of a signal processing circuit of an accelerometer for use with the transducer for FIG. 1.

FIG. 3 is a schematic diagram of a signal processing circuit 50 for an accelerometer using the transducer 10. One input 52 of the signal processing circuit 50 is connected to the charged mass condenser transducer (CMCT) 10 of FIG. 1. It will be understood that the CMCT 10 is connected to a unit under test such as a fan (not shown) for measuring, for instance, vibrations of the unit under test during operation. The second input 54 is connected to an ambient mechanical wave transducer (AMWT) 55 which is a suitable transducer to measure the ambient noise of the environment around the CMCT 10 which might cause the output signal of the CMCT 10 to be in error. The AMWT 55 might be another charged mass condenser transducer 10 of FIG. 1, or it might be a microphone for measuring the ambient acoustic noise. The output of the CMCT 10 will be the inherent operation vibration (IOV) plus the ambient mechanical wave (AMW) of the unit under test.

The input 52 is connected to the non-inverting input of an operational amplifier 56, and the input 54 is connected to the inverting input of the operational amplifier 56. The output 58 of the operational amplifier 56 will provide the difference of the signals on the inputs 52 and 54, or IOV+AMW−AMW which equals IOV. The IOV signal on the output 58 is inputted into the non-inverting input of a second operational amplifier 60. A feedback path 62 is provided from the output 64 of the operational amplifier 60 to its inverting input. It will be understood that the operational amplifier 60 is an amplifier, and the feedback path 62 is designed to give the desired gain to the amplifier formed by the operational amplifier 60. The output 64 of the circuit 50 provides a signal which is the amplified IOV signal. A null circuit 61 is provided between the offset null inputs of the operational amplifier 56 to match or null the AMW signal from the AMWT transducer 55 connected to the input 54 with the AMW signal from the CMCT transducer 10 connected to the input 52.

Figure 4:
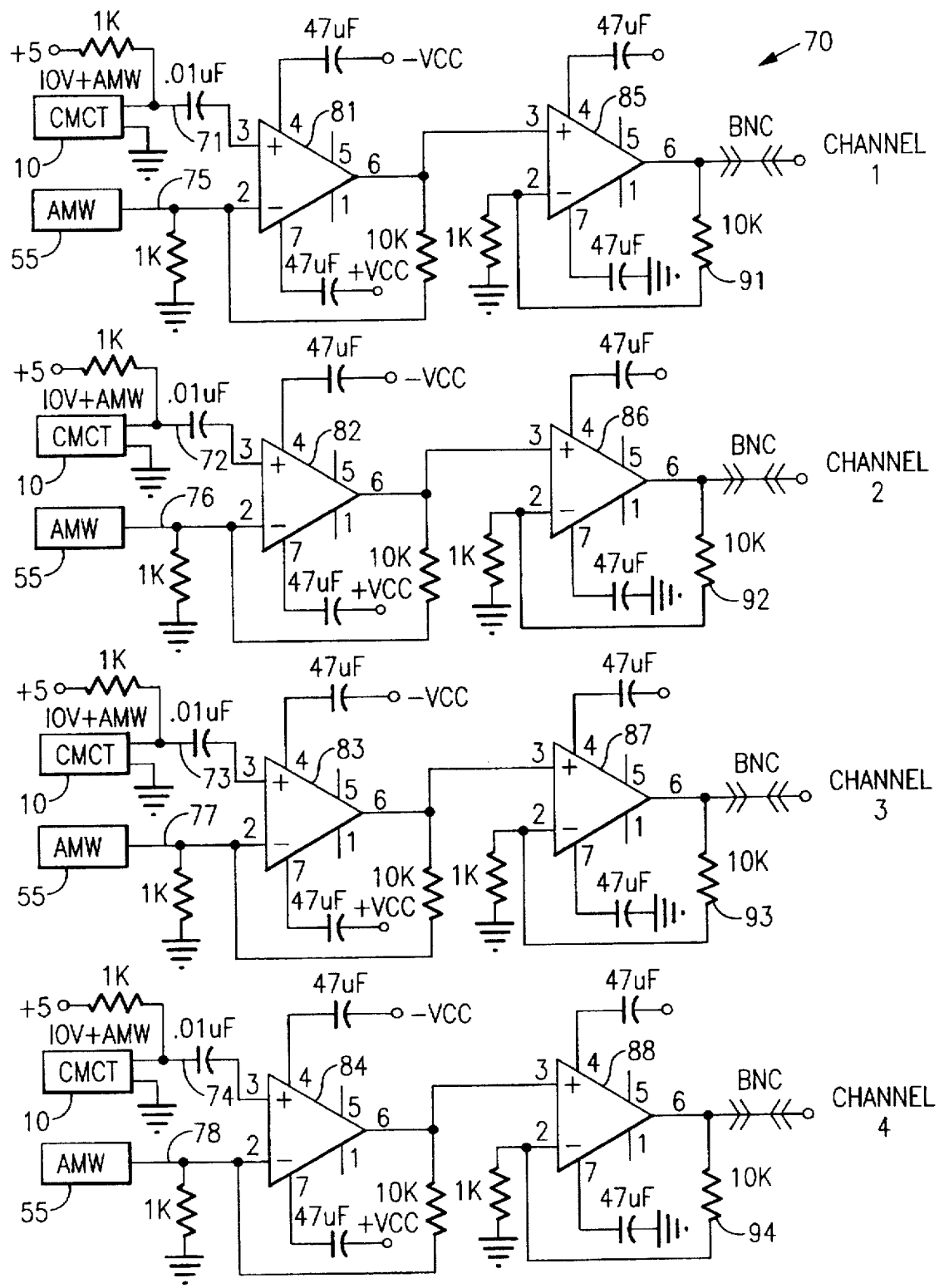
FIG. 4 a schematic diagram of another signal processing circuit of an accelerometer for use with the transducer of FIG. 1.

FIG. 4 is the schematic diagram of another signal processing circuit for an accelerometer using the transducer 10 of FIG. 1. In the case of circuit 70, up to four CMCT transducers 10 may be used. The CMCT transducers 10 are mounted on a unit under test, and may be placed so as to measure acceleration in two planes at right angles to each other, and/or may be placed to detect several sources, as desired. For instance, CMCT 10 is connected to input 71 to measure acceleration in the X direction, and a second CMCT 10 is connected to input 72 to measure the acceleration in the Y direction. Other CMCT transducers 10 may by connected at other possible sources of vibration to the remaining inputs 73 and 74, or a third direction Z may be measured, as desired. Suitable ambient AMWT transducers 55 are connected to the input 75, 76, 77 and 78 to measure ambient noise, one for each of the inputs 71, 72, 73 and 74, respectively.

The circuit 70 includes operational amplifiers 81–88. As will be explained, operation amplifier 81 cancels the ambient mechanical wave input at 75 from the signal input at 71, thus giving an $IOV_1$ signal at its output, and operational amplifier 82 cancels the ambient mechanical wave from the signal input at 76 from the signal from the signal input at 72, thus giving an $IOV_2$ signal at its output. Likewise, the outputs of operational amplifiers 83 and 84 give the $IOV_3$ and $IOV_4$, respectively. The operational amplifiers 85–88 amplifies the $IOV_1$–$IOV_4$ signals, respectively.

A null circuit 90, shown in FIG. 5 is connected across the offset null inputs of each operational amplifier 81–84 to match or null the AMW signal of the AMWT transducer with the AMW signal for the CMCT signal input into each operational amplifier. The null circuits 90 is adjusted while the unit under test is subjected only to the ambient mechanical wave such that the output of the operational amplifiers 81–84 is zero. Thus, when the unit under test is tested, the CMCT transducers 10 connected to inputs 71–74 start outputing IOV+AMW signals, and the operational amplifiers 81–84 will output $IOV_1$–$IOV_4$ signals, respectively. The operational amplifiers 85–88, with feedback paths 91–96, respectively, act as bypass filters for the $IOV_1$–$IOV_4$ signals, respectively, such that the IOV signals are amplified in a desired range of signal frequencies.

The operational amplifiers 56 and 60 of FIG. 3 and 81–88 of FIG. 4 may be 6158 operational amplifiers.

Thus, the accelerometer of the present invention is inexpensive to make using inexpensive components, and results in an accelerometer which is particularly suited for measuring cyclical accelerations having low frequencies in the order of 1 to 180 hertz. The output of the accelerometer of the present invention may be inputted into an analog-to-digital converter, and the digitized signal may be inputted into a computer, such as a personal computer, for display, data processing or data storage, as desired.

While I have illustrated and described the preferred embodiment of my invention, it is to be understood that I do not limit myself to the precise construction herein disclosed, and the right is reserved to all changes and modifications coming within the scope of the invention as defined in the appended claims.

Having thus described my invention, what I claim as new, and desire to secure by Letters Patent is:

1. A charged mass thin film condenser transducer comprising:
   a housing;
   spaced apart planar electrodes in said housing forming a condenser whose capacitance changes when a first one of the planar electrodes is flexed, said first electrode being a thin film;
   a spherical mass located in said housing connected to and flexing said first planar electrode responsive to acceleration; and
   an electrical amplifier having an input terminal connected to a second one of said planar electrodes for sensing changes of capacitance of said condenser, and an output terminal for providing an electrical output which changes according to the change of capacitance of said condenser.

2. The charged mass thin film condenser transducer of claim 1 wherein said mass is a 4.5 mm steel airgun shot.

3. The charged mass thin film condenser transducer of claim 1 wherein said mass is a sphere having a weight of about 5.5 grains.

4. The charged mass thin film condenser transducer of claim 1 wherein said first planar electrode is a thin film of 1 mil thick polyester aluminized metallic film.

5. The charged mass thin film condenser transducer of claim 1 wherein said electrical amplifier is an NPN transistor having a base connected to said second planar electrode, an emitter extending out of said housing for forming a first output lead, and a collector forming a second, grounding, output lead.

6. The charged mass thin film condenser transducer of claim 5 wherein said second planer electrode includes a slot therein for allowing air to pass therethrough as said first planar electrode flexes.

7. The charged mass thin film condenser transducer of claim 1 wherein said housing has a larger portion and a smaller portion, said spaced apart planar electrodes being located in said larger portion of said housing, and said mass being on one side of said condenser and extending into said smaller portion of said housing.

8. The charged mass thin film condenser transducer of claim 7 wherein said planar electrodes are spaced apart by a spacer ring formed of a dielectric material.

9. The charged mass thin film condenser transducer of claim 8 wherein said first planar electrode comprises a stiffening ring and a thin film of polyester aluminized metallic film spread over said stiffening ring, said mass is a metal sphere attached to the center of said thin film, and said spacer ring is of sufficient thickness to prevent contact between said planar electrodes when said thin film is flexed from said stiffening ring of said first planar electrode toward said second planar electrode.

10. The charged mass thin film condenser transducer of claim 9 wherein said first planar electrode is in said larger portion of said housing having one side against the smaller portion of said housing, and said second planar electrode is secured in said larger portion of said housing with said spacer ring between said planar electrodes for forming a condenser.

11. The charged mass thin film condenser transducer of claim 1 further comprising;
   an operational amplifier having a first input connected to said output terminal of said electrical amplifier, a second input, offset null inputs and an output;
   an ambient mechanical wave transducer for measuring ambient mechanical waves, said ambient mechanical wave transducer connected to said second input of said operational amplifier; and
   a null circuit connected to the offset null inputs of said operational amplifier for providing on the output of said operational amplifier, an output signal which is the difference of a signal from the output terminal of said electrical amplifier and the signal from said ambient mechanical wave transducer.

12. The charged mass thin film condenser transducer of claim 11 further comprising a second operational amplifier connected to the output of said first mentioned operational amplifier, said second operational amplifier acting as an amplifier for a signal on the output of said first mentioned operational amplifier.

\* \* \* \* \*